United States Patent [19]
Shuhsiang

[11] Patent Number: 5,501,326
[45] Date of Patent: Mar. 26, 1996

[54] LASER RECORD PROTECTION FOLDER

[76] Inventor: Wu C. Shuhsiang, No.40-1, Lane 47, Sec.1, Shui-Yuan St., Tan-Shui Town, Taipei Hsien, Taiwan

[21] Appl. No.: 494,961

[22] Filed: Jun. 26, 1995

[51] Int. Cl.⁶ .................................................. B65D 85/57
[52] U.S. Cl. .................................. 206/307.1; 206/308.1; 206/232; 206/425
[58] Field of Search ................................. 206/307.1, 307, 206/308.1, 308.3, 311, 312, 313, 232, 425

[56] References Cited

U.S. PATENT DOCUMENTS

| | | | |
|---|---|---|---|
| 2,625,935 | 1/1953 | Marano | 206/311 |
| 4,884,691 | 12/1989 | Behrens et al. | 206/311 X |
| 5,193,681 | 3/1993 | Lievsay | 206/311 X |
| 5,290,118 | 3/1994 | Ozeki | 206/308.1 X |

*Primary Examiner*—Jacob K. Ackun
*Attorney, Agent, or Firm*—W. Wayne Liauh

[57] ABSTRACT

A laser record protection folder, of which the inside of the outer cover is provided with a loose-leaf fastener and a bag element for inserting a laser record therein; the bag element is substantially a thin piece to take a very small space; several bag elements can be mounted in one outer cover, and therefore a considerable space will be saved and the folder can be carried by a user easily. The bag elements are to be attached to the loose-leaf fastener so as to mount more or less bag elements therein flexibly if necessary.

6 Claims, 3 Drawing Sheets

LASER RECORD PROTECTION FOLDER

BACKGROUND OF THE INVENTION

A conventional laser record protection box is usually a flat and square box, which can merely receiver one laser record; if a plurality of records have to be carried, more space will be required, i.e., it is rather inconvenient to a person to carry more records.

SUMMARY OF THE INVENTION

This invention relates to a laser record protection folder, which comprises an outer cover with a laser-leaf fastener to fasten several bag elements. The inner end of each bag element has several binding holes to be mated with several corresponding binding rings; the outer of the bag element is formed into a semi-circular shape. One side of the outer end is provided with two dividing lines and a slot so as to form into two opening flaps to facilitate a laser record to insert in the bag element. The outer end has also a projected center flap for retaining a laser record therein without shipping out unintentionally. Such a protection folder can facilitate laser records to be carried with less space, and the number of the laser records carried may be varied flexibly, if necessary.

DETAILED DESCRIPTION

Figure 1:
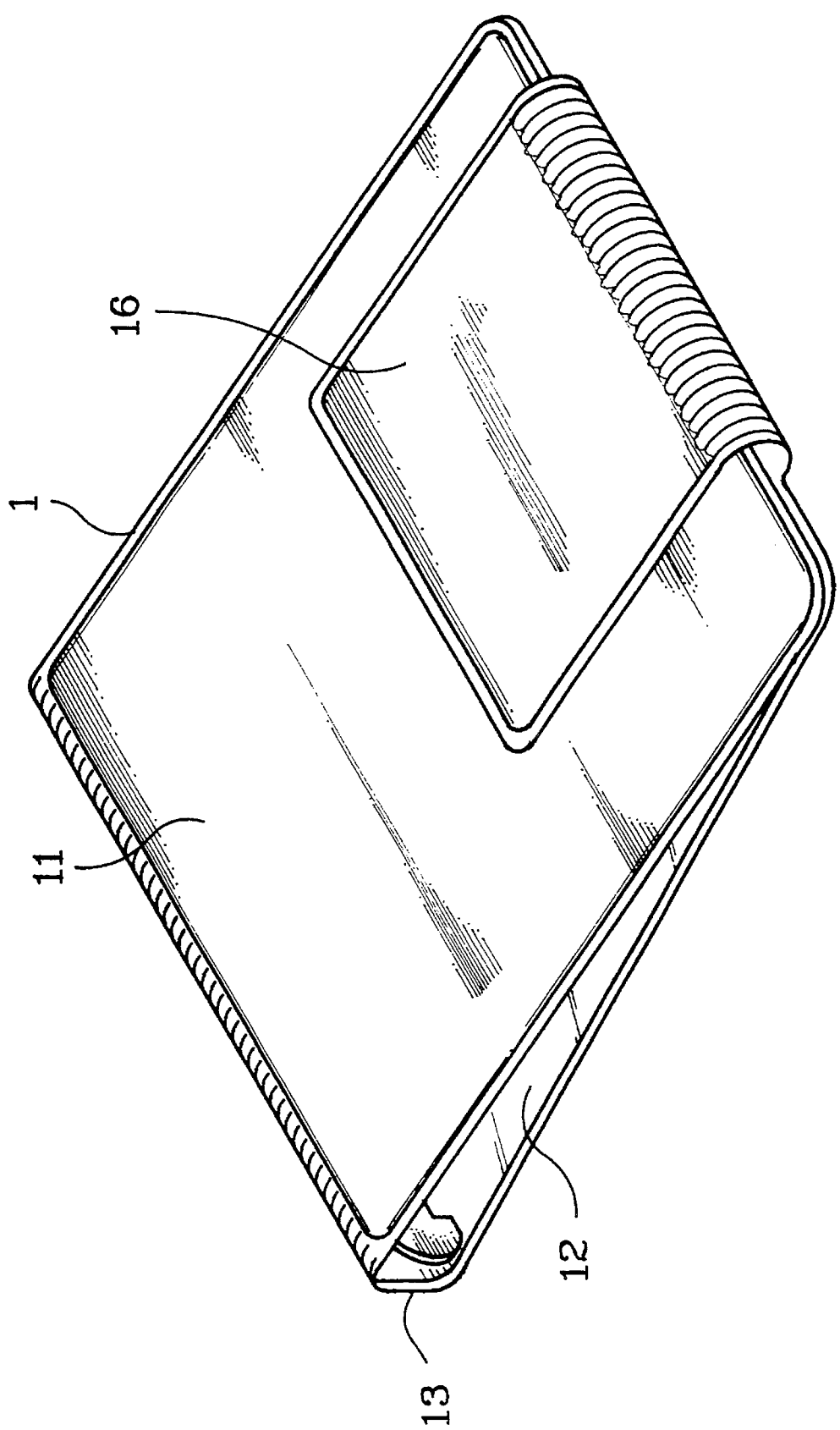
FIG. 1 is a perspective view of an embodiment according to the present invention.
Figure 2:
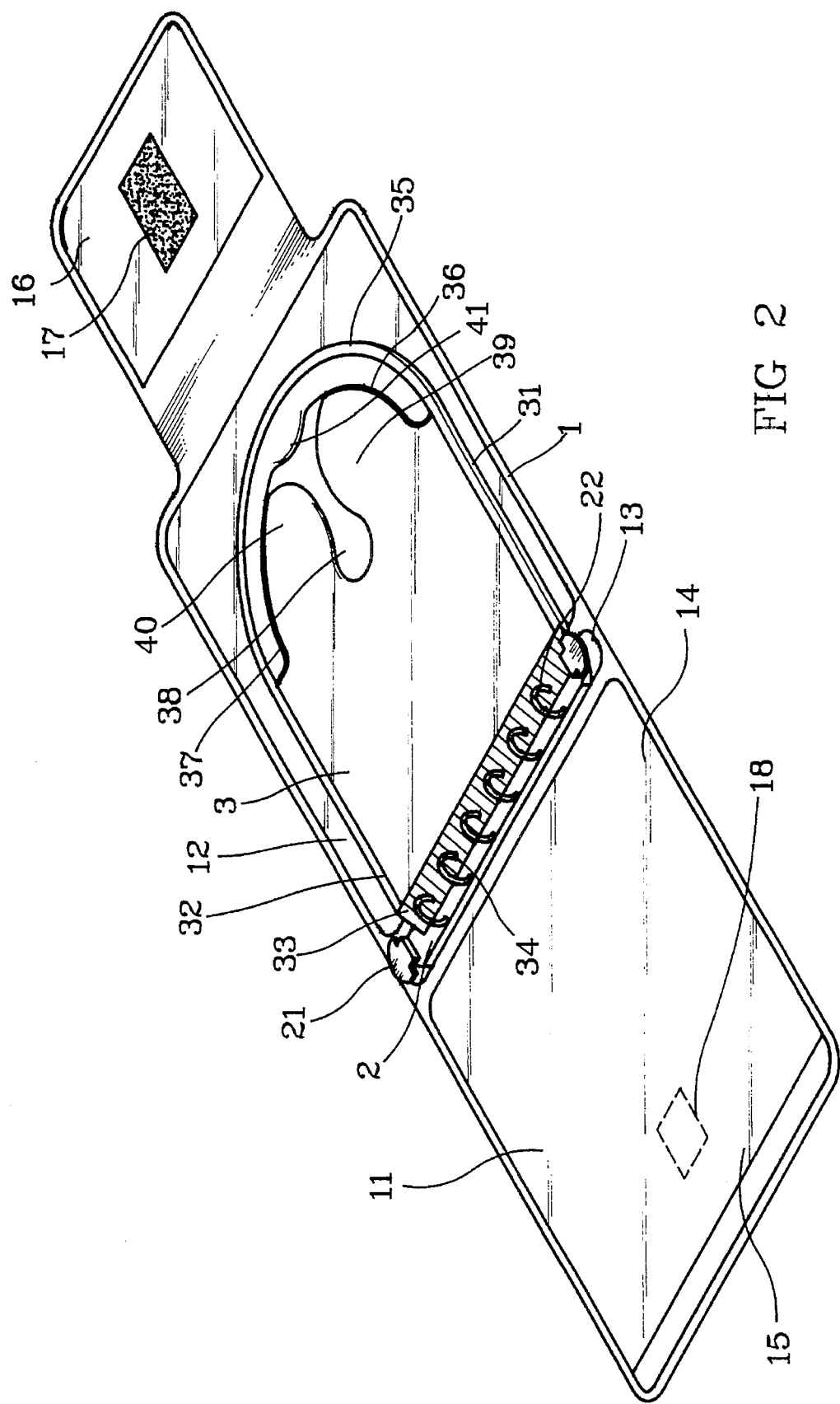
FIG. 2 is a perspective view of the inner structure of the present invention.

Referring to FIGS. 1 and 2, the present invention is illustrated with an outer and inner perspective views respectively. The record protection folder according to the present invention comprises an outer cover 1, a loose-leaf fastener 2 and several bag elements 3. The outer cover 1 includes a front cover 11, a rear cover 12 and a connection portion 13 for connecting the aforesaid two covers. The front and the rear covers 11 and 12 are substantially two opposite square and flat parts; the area of each of them is larger than that of a laser record. The inner sides of the front cover 11 ( or the rear cover ) is provided with a transparent side bag 14 with an opening towards outside; the transparent side bag 14 is used for inserting a card of contents or the like for writing words. Under the transparent side bag 14, there is furnished with an opaque side bag 15 for receiving miscellaneous things. The outer end of the rear cover 12 extends outwards to form into a fastening flap 16 with a fiber-face Velcro tape 17, which is to be mated with a hook-face Velcro tape 18 on the outside of the front cover 11 so as to have the Velcro tapes 17 and 18 fastened together, and to have the outer cover 1 fixed in place; of course, the Velcro tapes may be replaced with other type of fasteners.

The loose-leaf fastener 2 is substantially a strip number, having the same length as that of the connection portion 13. Both ends of the loose-leaf fastener 2 are furnished with two lock lugs 21 respectively; a given number of binding rings 22 are provided between the two lock lugs 21. The loose-leaf fastener 2 is fixedly attached to the connection portion 13 inside the outer cover 1. The binding rings 22 can be opened by pushing the lock lugs 21 for binding the bag elements 3 in place.

Figure 3:
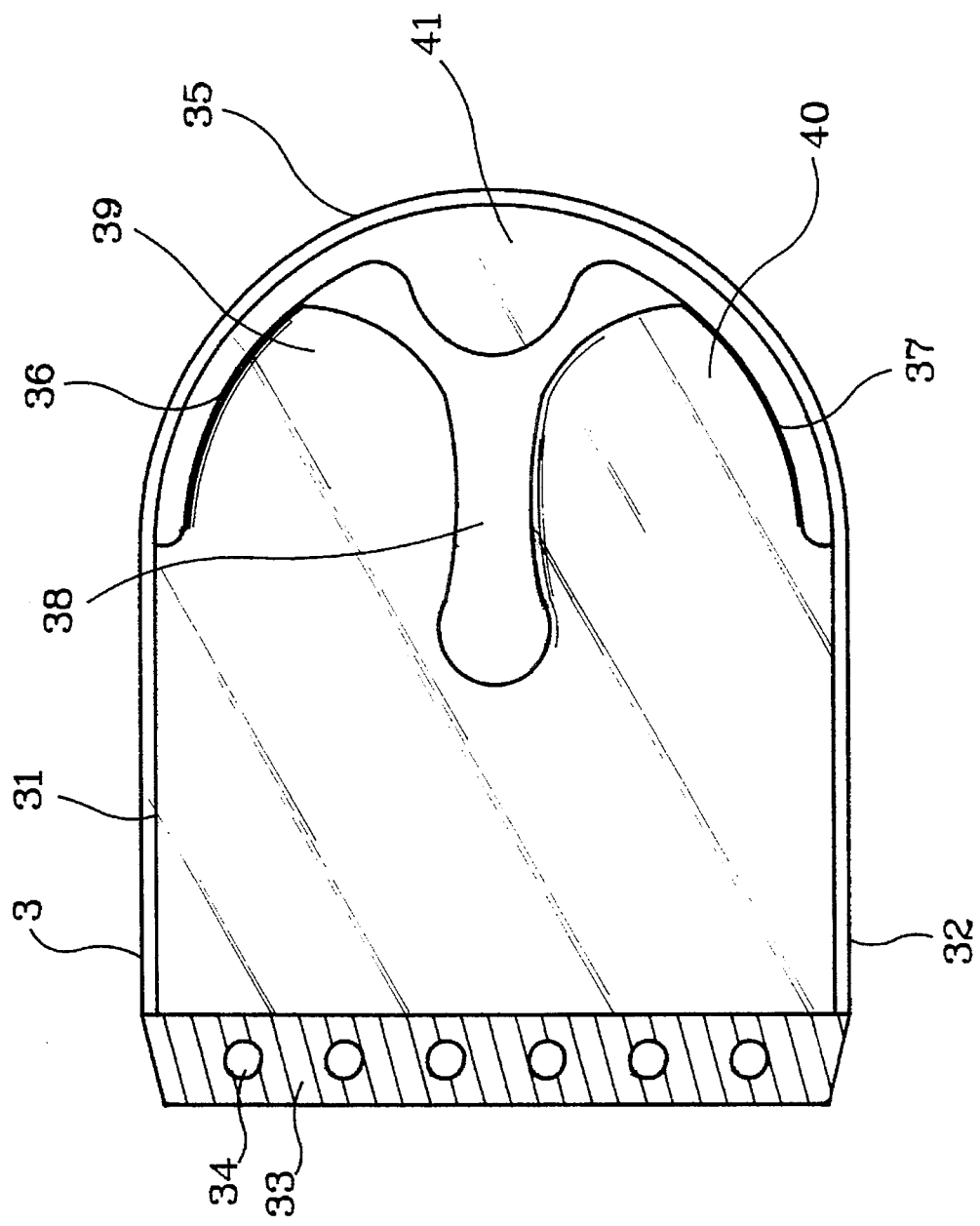
FIG. 3 is a plan view of the bag body of the present invention.

The bag elements 3 (as shown in FIG. 3) is made of E.F.P. ( an environmental protection plastic material ); the inner end of the bag element 3 is a square-shaped end, while the outer end thereof is a semi-circular-shaped end. The bag element 3 includes two pieces, of which the upper and lower sides are sealed together to form into the first sealed edge 31 and the second sealed edge 32 respectively. The inner end of the bag element 3 is also sealed as the third sealed edge 33 perpendicular to the first and second edges 31 and 32. The third sealed edge 33 is a wider edge, and a binding edge, which is provided with a plurality of binding holes 34 corresponding to that of the binding rings 22 of the loose-leaf fastener 2. The outer end of the third sealed edge 33 is referred to a semi-circular fourth sealed edge 35; in other words, the bag element 3 is a sealed bag with two pieces. The semi-circular-shaped end of the top piece (or bottom piece) of the bag element 3 has a parallel and semi-circular band, with an upper dividing line 36 and a lower dividing line 37 along the fourth sealed line 35. Between the upper and lower dividing lines 36 and 37, there is furnished with a y-shaped slot 38, which enables the top piece of the bag element 3 to be divided into two opening flaps 39 and 40 so as to facilitate a laser record to insert into the bag element 3; further, the outer end of the bag element 3 has a center flap 41, which is used for retaining the laser record therein without slipping out of the bag 3.

Since the bag element 3 is substantially a flat member, it occupies a very small space, i.e., several bag elements 3 can be filled in one outer cover 1; therefore, it can save a considerable space upon being stored and carried by a user. Since the bag elements 3 are attached in the outer cover 1 by means of the loose-leaf fastener 2, the number of the bag elements can be increased or decreased, if necessary.

I claim:

1. A laser record protection folder comprising:

an outer cover including a front cover, a rear cover, and a connection portion for connecting said two covers together; outer ends of said front cover and said rear cover extended with a fastening flap provided with fastening elements;

a loose-leaf fastener including two lock lugs on both ends thereof, and a plurality of binding rings;

several bag elements, of which each including two pieces; outer edge of said two pieces being sealed together; inner end of said bag element furnished with a plurality of binding holes so as to be attached with said loose-leaf fastener; outer end of said bag element formed into a semi-circular shape; outer end of one said piece of said bag element being an opening piece by means of dividing lines and a slot so as to facilitate a laser record to insert therein; outer end of said bag element having a center flap for retaining a laser record therein;

aforesaid loose-leaf fastener being fixedly attached to said connection portion inside said outer cover;

said bag element being attached to said binding rings by means of said binding holes; said bag element being used for receiving a laser record.

2. A laser record protection folder as claimed in claim 1, wherein said fastening elements on said outer cover are made of a Velcro tape.

3. A laser record protection folder as claimed in claim 1, wherein inner side of said front cover or said rear cover is provided with a transparent side bag for receiving a card of contents.

4. A laser record protection folder as claimed in claim 1, wherein said bag element is made of E.F.P.

5. A laser record protection folder as claimed in claim 1, wherein said front cover on said rear cover is furnished with a side bag.

6. A laser record protection folder as claimed in claim 1, wherein a semi-circular outer end of one piece of said bag element is provided with an upper dividing line and a lower dividing line, and a y-shaped slot so as to form into two opening flaps.

* * * * *